United States Patent [19]
Shibahashi et al.

[11] Patent Number: 6,048,387
[45] Date of Patent: Apr. 11, 2000

[54] REVERSIBLE THERMOCHROMIC COMPOSITION

[75] Inventors: Yutaka Shibahashi; Jun Sugai, both of Nagoya, Japan

[73] Assignee: The Pilot Ink Co., Ltd., Nagoya, Japan

[21] Appl. No.: 09/165,109

[22] Filed: Oct. 2, 1998

[30] Foreign Application Priority Data

Oct. 7, 1997 [JP] Japan .................................. 9-291630

[51] Int. Cl.⁷ .................................................. C09D 11/00
[52] U.S. Cl. ........................................................ 106/31.21
[58] Field of Search ........................................... 106/31.21

[56] References Cited

U.S. PATENT DOCUMENTS

| | | | |
|---|---|---|---|
| 3,896,128 | 7/1975 | Kast et al. | 260/256.4 |
| 3,931,182 | 1/1976 | Kast et al. | 260/256.4 |
| 4,028,118 | 6/1977 | Nakasuji et al. | 106/21 |
| 4,052,398 | 10/1977 | Kast et al. | 260/256.4 |
| 4,169,183 | 9/1979 | Mitchell | 428/307 |
| 4,421,560 | 12/1983 | Kito et al. | 106/31.21 |
| 4,425,161 | 1/1984 | Shibahashi et al. | 106/31.21 |
| 4,720,301 | 1/1988 | Kito et al. | 106/21 |
| 4,732,810 | 3/1988 | Kito et al. | 428/402.2 |
| 5,350,633 | 9/1994 | Sumii et al. | 106/31.21 |
| 5,350,634 | 9/1994 | Sumii et al. | 106/31.21 |
| 5,527,385 | 6/1996 | Sumii et al. | 106/31.21 |

FOREIGN PATENT DOCUMENTS

| | | |
|---|---|---|
| 659 585 | 6/1995 | European Pat. Off. . |
| 873 881 | 10/1998 | European Pat. Off. . |

*Primary Examiner*—Helene Klemanski
*Assistant Examiner*—Veronica F. Faison
*Attorney, Agent, or Firm*—Fitzpatrick, Cella, Harper & Scinto

[57] ABSTRACT

A reversible thermochromic composition is provided which contains a specified diazarhodamine lactone derivative as an electron-donating color-developing organic compound, an electron-accepting compound, and a reaction medium for causing an electron exchange reaction between the components and reversibly at a specified temperature range. This reversible thermochromic composition develops clear reddish color at a colored state, and becomes colorless at a decolored state without residual color.

5 Claims, No Drawings

REVERSIBLE THERMOCHROMIC COMPOSITION

BACKGROUND OF THE INVENTION

1. Field of the Invention

The present invention relates to a reversible thermochromic composition. Specifically, the present invention relates to a reversible thermochromic composition which develops a clear color in red hue, especially a vivid pink color in a colored state, and becomes colorless in a decolored state.

2. Related Background Art

There have been several propositions on a reversible thermochromic composition which comprises a solubilized mixture of an electron-donating color-developing organic compound, an electron-accepting compound and a reaction medium to cause a reversible electron-exchange reaction between them in a specified temperature range, as disclosed in U.S. Pat. No. 4,028,118, U.S. Pat. No. 4,720,301, and U.S. Pat. No. 4,732,810.

For developing a red color, a benzofluorane type compound is conventionally used as the electron-donating color-developing organic compound in the reversible thermochromic compositions. However, a composition containing the benzofluorane compound develops a relatively dark bluish pink color, not suitable when a vivid pink color is required and useful only in limited application fields.

Rhodamine lactone type compounds can be also used as the electron-donating color-developing organic compounds for development of a red color. However, a composition containing the rhodamine lactone type compound, even though it develops a clear red color, leaves residual color in a decolored state, and is not suitable for practical use.

SUMMARY OF THE INVENTION

An object of the present invention is to provide a reversible thermochromic composition which develops a clear red color in a colored state, and is decolored without any residual colors, which cannot be achieved by conventional reversible thermochromic compositions.

The reversible thermochromic composition of the present invention contains (A) a diazarhodamine lactone derivative represented by General Formula (1) below as an electron-donating color-developing organic compound, (B) an electron-accepting compound, and (C) a reaction medium for causing an electron exchange reaction between the components (A) and (B) reversibly at a specified temperature range:

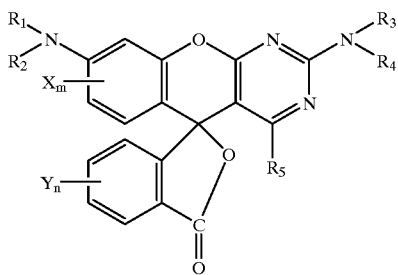

(1)

where $R_1$ and $R_2$ are independently hydrogen, $C_1$–$C_8$ alkyl or hydroxy alkyl, $C_2$–$C_{12}$ alkoxyalkyl, $C_4$–$C_{11}$ carboalkoxyalkyl, phenyl, $C_7$–$C_{12}$ phenylalkyl, or phenyl substituted with chlorine, bromine, or $C_1$–$C_4$ alkyl or alkoxy; $R_3$ and $R_4$ are independently hydrogen, $C_1$–$C_8$ alkyl, $C_5$–$C_7$ cycloalkyl or hydroxyalkyl, $C_2$–$C_{12}$ alkoxyalkyl, $C_4$–$C_{11}$ carboalkoxyalkyl, or $C_7$–$C_{12}$ phenylalkyl; $R_1$ and $R_2$, and $R_3$ and $R_4$ may be linked together to form a ring; $R_5$ is $C_1$–$C_3$ alkyl, $C_1$–$C_4$ alkoxy, phenyl, or phenyl substituted with chlorine, bromine, or $C_1$–$C_4$ alkyl or alkoxy; X and Y are independently chlorine, or $C_1$–$C_3$ alkyl, hydroxyalkyl, or halogenalkyl; m is an integer of 0 to 3; and n is an integer of 0 to 4.

The reversible thermochromic composition of the present invention, which employs a diazarhodamine lactone derivative as an electron-donating color-developing organic compound, develops more clear red color than that achieved by a conventional benzofluorane compounds or a conventional rhodamine lactone compound at a colored state, and becomes colorless at a decolored state without a residual color.

The light-fastness of the electron-donating color-developing organic compound is improved by addition of a photostabilizer. Thereby, thermochromic property of the reversible thermochromic composition can be maintained without deterioration.

DETAILED DESCRIPTION OF THE PREFERRED EMBODIMENTS

Seeking after a thermochromic composition which develops a clear red color and completely decolors reversibly, the inventors of the present invention have found a solubilized system comprising a specific diazarhodamine lactone derivative as the electron-donating color-developing organic compound, an electron-accepting compound serving as a color-developer therefor in a color development system by electron exchange, and a reaction medium for causing color development and decoloration at a specified temperature range. Thus the present invention has been accomplished.

The reversible thermochromic composition of the present invention contains (A) a diazarhodamine lactone derivative represented by General Formula (1) below as an electron-donating color-developing organic compound, (B) an electron-accepting compound, and (C) a reaction medium for causing an electron exchange reaction between the components (A) and (B) reversibly at a specified temperature range:

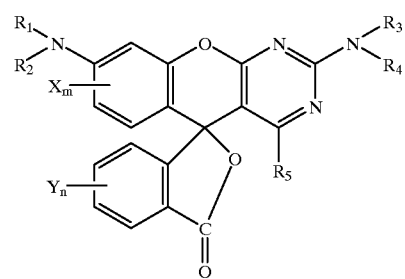

(1)

where $R_1$ and $R_2$ are independently hydrogen, $C_1$–$C_8$ alkyl or hydroxy alkyl, $C_2$–$C_{12}$ alkoxyalkyl, $C_4$–$C_{11}$ carboalkoxyalkyl, phenyl, $C_7$–$C_{12}$ phenylalkyl, or phenyl substituted with chlorine, bromine, or $C_1$–$C_4$ alkyl or alkoxy; $R_3$ and $R_4$ are independently hydrogen, $C_1$–$C_8$ alkyl, $C_5$–$C_7$ cycloalkyl or hydroxyalkyl, $C_2$–$C_{12}$ alkoxyalkyl, $C_4$–$C_{11}$ carboalkoxyalkyl, or $C_7$–$C_{12}$ phenylalkyl; $R_1$ and $R_2$, and $R_3$ and $R_4$ may form together a ring; $R_5$ is $C_1$–$C_3$ alkyl, $C_1$–$C_4$ alkoxy, phenyl, or phenyl substituted with chlorine, bromine, or $C_1$–$C_4$ alkyl or alkoxy; X and Y are independently chlorine, or $C_1$–$C_3$ alkyl, hydroxyalkyl, or halogenalkyl; m is an integer of 0 to 3; and n is an integer of 0 to 4.

Components (A), (B), and (C) are described below specifically.

Component (A), the diazarhodamine lactone derivative, is exemplified by the following compounds:

spiro[5H-(1)benzopyrano(2,3-d)pyrimidine-5,1'(3'H)-isobenzofuran]-3'-one, 2-(dimethylamino)-8-(dimethylamino)-4-methyl-, spiro[5H-(1)benzopyrano(2,3-d)pyrimidine-5,1'(3'H)-isobenzofuran]-3'-one, 2-(diethylamino)-8-(diethylamino)-4-methyl-, spiro[5H-(1)benzopyrano(2,3-d)pyrimidine-5,1'(3'H)-isobenzofuran]-3'-one, 2-(di-n-propylamino)-8-(di-n-propylamino)-4-methyl-;

spiro[5H-(1)benzopyrano(2,3-d)pyrimidine-5,1'(3'H)-isobenzofuran]-3'-one, 2-(di-n-butylamino)-8-(di-n-butylamino)-4-methyl-, spiro[5H-(1)benzopyrano(2,3-d)pyrimidine-5,1'(3'H)-isobenzofuran]-3'-one, 2-(di-n-butylamino)-8-(dimethylamino)-4-methyl-, spiro[5H-(1)benzopyrano(2,3-d)pyrimidine-5,1'(3'H)-isobenzofuran]-3'-one, 2-(di-n-butylamino)-8-(diethylamino)-4-methyl-, spiro[5H-(1)benzopyrano(2,3-d)pyrimidine-5,1'(3'H)-isobenzofuran]-3'-one, 2-(di-n-butylamino)-8-(N-ethyl-N-isobutylamino)-4-methyl-, spiro[5H-(1)benzopyrano(2,3-d)pyrimidine-5,1'(3'H)-isobenzofuran]-3'-one, 2-(di-n-butylamino)-8-(N-ethyl-N-isoamylamino)-4-methyl-, spiro[5H-(1)benzopyrano(2,3-d)pyrimidine-5,1'(3'H)-isobenzofuran]-3'-one, 2-(di-n-butylamino)-8-(N-ethyl-N-n-hexylamino)-4-methyl-, spiro[5H-(1)benzopyrano(2,3-d)pyrimidine-5,1'(3'H)-isobenzofuran]-3'-one, 2-(di-n-butylamino)-8-(di-n-amylamino)-4-methyl-, spiro[5H-(1)benzopyrano(2,3-d)pyrimidine-5,1'( 3'H)-isobenzofuran]-3'-one, 2-(di-n-butylamino)-8-(n-octylamino)-4-methyl-, spiro[5H-(1)benzopyrano(2,3-d)pyrimidine-5,1'(3'H)-isobenzofuran]-3'-one, 2-(dimethylamino)-8-(diethylamino)-4-methyl-, spiro[5H-(1)benzopyrano(2,3-d)pyrimidine-5,1'(3'H)-isobenzofuran]-3'-one, 2-(diethylamino)-8-(dimethylamino)-4-methyl-, spiro[5H-(1)benzopyrano(2,3-d)pyrimidine-5,1'(3'H)-isobenzofuran]-3'-one, 2-(morpholino)-8-(diethylamino)-4-methyl-, spiro[5H-(1)benzopyrano(2,3-d)pyrimidine-5,1'(3'H)-isobenzofuran]-3'-one, 2-(piperidino)-8-(diethylamino)-4-methyl-, spiro[5H-(1)benzopyrano(2,3-d)pyrimidine-5,1'(3'H)-isobenzofuran]-3'-one, 2-(N-methylpiperazino)-8-(diethylamino)-4-methyl-, spiro[5H-(1)benzopyrano(2,3-d)pyrimidine-5,1'(3'H)-isobenzofuran]-3'-one, 2-(pyrrolidino)-8-(diethylamino)-4-methyl-, spiro[5H-(1)benzopyrano(2,3-d)pyrimidine-5,1'(3'H)-isobenzofuran]-3'-one, 2-(diethylamino)-8-(diethylamino)-4-methyl-4',5',6',7'-tetrachloro-, spiro[5H-(1)benzopyrano(2,3-d)pyrimidine-5,1'(3'H)-isobenzofuran]-3'-one, 2-(diethylamino)-8-(diethylamino)-, spiro[5H-(1)benzopyrano(2,3-d)pyrimidine-5,1'(3'H)-isobenzofuran]-3'-one, 2-(di-n-butylamino)-8-(di-n-butylamino)-, spiro[5H-(1)benzopyrano(2,3-d)pyrimidine-5,1'(3'H)-isobenzofuran]-3'-one, 2-(N-ethyl-N-isoamylamino)-8-(N-ethyl-N-isoamylamino)-, spiro[5H-(1)benzopyrano(2,3-d)pyrimidine-5,1'(3'H)-isobenzofuran]-3'-one, 2-(di-n-butylamino)-8-(diethylamino)-, spiro[5H-(1)benzopyrano(2,3-d)pyrimidine-5,1'(3'H)-isobenzofuran]-3'-one, 2-(di-n-butylamino)-8-(N-ethyl-N-isoamylamino)-, spiro[5H-(1)benzopyrano(2,3-d)pyrimidine-5,1'(3'H)-isobenzofuran]-3'-one, 2-(piperidino)-8-(ethylamino)-4-methyl-7-methyl-, spiro[5H-(1)benzopyrano(2,3-d)pyrimidine-5,1'(3'H)-isobenzofuran]-3'-one, 2-(di-n-butylamino)-8-(diethylamino)-4-methyl-7-methyl-, spiro[5H-(1)benzopyrano(2,3-d)pyrimidine-5,1'(3'H)-isobenzofuran]-3'-one, 2-(di-n-butylamino)-8-(diethylamino)-4-methyl-7-ethyl-, spiro[5H-(1)benzopyrano(2,3-d)pyrimidine-5,1'(3'H)-isobenzofuran]-3'-one, 2-(di-n-butylamino)-8-(diethylamino)-4-phenyl-, spiro[5H-(1)benzopyrano(2,3-d)pyrimidine-5,1'(3'H)-isobenzofuran]-3'-one, 2-(di-n-butylamino)-8-(di-n-butylamino)-4-phenyl-, spiro[5H-(1)benzopyrano(2,3-d)pyrimidine-5,1'( 3'H)-isobenzofuran]-3'-one, 2-(di-n-butylamino)-8-(N-ethyl-N-isoamylamino)-4-phenyl-, spiro[5H-(1)benzopyrano(2,3-d)pyrimidine-5,1'(3'H)-isobenzofuran]-3'-one, 2-(piperidino)-8-(diethylamino)-4-phenyl-, spiro[5H-(1)benzopyrano(2,3-d)pyrimidine-5,1'(3'H)-isobenzofuran]-3'-one, 2-(N-methyl-N-cyclohexylamino)-8-(diethylamino)-4-phenyl-, spiro[5H-(1)benzopyrano(2,3-d)pyrimidine-5,1'(3'H)-isobenzofuran]-3'-one, 2-(dimethylamino)-8-(diethylamino)-4-phenyl-, spiro[5H-(1)benzopyrano(2,3-d)pyrimidine-5,1'(3'H)-isobenzofuran]-3-one, 2-(isoamylamino)-8-(diethylamino)-4-phenyl-, spiro[5H-(1)benzopyrano(2,3-d)pyrimidine-5,1'(3'H)-isobenzofuran]-3'-one, 2-(pyrrolidino)-8-(diethylamino)-4-phenyl-, spiro[5H-(1)benzopyrano(2,3-d)pyrimidine-5,1'(3'H)-isobenzofuran]-3'-one, 2-(N-methylpiperazino)-8-(diethylamino)-4-phenyl-, spiro[5H-(1)benzopyrano(2,3-d)pyrimidine-5,1'(3'H)-isobenzofuran]-3'-one, 2-(morpholino)-8-(diethylamino)-4-phenyl-, spiro[5H-(1)benzopyrano(2,3-d)pyrimidine-5,1'(3'H)-isobenzofuran]-3'-one, 2-(N-methyl-N-benzylamino)-8-(diethylamino)-4-phenyl-, spiro[5H-(1)benzopyrano(2,3-d)pyrimidine-5,1'(3'H)-isobenzofuran]-3'-one, 2-[di(2-methoxyethyl)amino]-8-(diethylamino)-4-phenyl-, spiro[5H-(1)benzopyrano(2,3-d)pyrimidine-5,1'(3'H)-isobenzofuran]-3'-one, 2-(di-n-butylamino)-8-(diethylamino)-4-(4-methoxyphenyl)-, spiro[5H-(1)benzopyrano(2,3-d)pyrimidine-5,1'(3'H)-isobenzofuran]-3'-one, 2-(di-n-butylamino)-8-(diethylamino)-4-(4-chlorophenyl)-, spiro[5H-(1)benzopyrano(2,3-d)pyrimidine-5,1'(3'H)-isobenzofuran]-3'-one, 2-(di-n-butylamino)-8-(diethylamino)-4-(4-methylphenyl)- , spiro[5H-(1)benzopyrano(2,3-d)pyrimidine-5,1'(3'H)-isobenzofuran]-3'-one, 2-[di(2-ethoxyethyl)amino]-8-(dimethylamino)-4-phenyl-, spiro[5H-(1)benzopyrano(2,3-d)pyrimidine-5,1'(3'H)-isobenzofuran]-3'-one, 2-(diethylamino)-8-[(2-methylphenyl)amino]-4-phenyl-, spiro[5H-(1)benzopyrano(2,3-d)pyrimidine-5,1'(3'H)-isobenzofuran]-3'-one, 2-(2,6-dimethylmorpholino)-8-(diethylamino)-4-phenyl-, spiro[5H-(1)benzopyrano(2,3-d)pyrimidine-5,1'(3'H)-isobenzofuran]-3'-one, 2-(dicyclohexylamino)-8-(dimethylamino)-4-phenyl-, and spiro[5H-(1)benzopyrano(2,3-d)pyrimidine-5,1'(3'H)-isobenzofuran]-3'-one, 2-(dibutylamino)-8-[(4-chlorophenyl)amino]-4-phenyl-.

When $R_3$ and $R_4$ form a ring, the ring may be a five-to seven-membered saturated heterocyclic ring, or a six-membered heterocyclic ring containing O, S, or $NR_6$ is a ring member (where $R_6$ is hydrogen, methyl, or ethyl).

When the integer m is 2 or more, the groups X may be the same or different from each other. When the integer n is 2 or more, the groups Y may be the same or different from each other.

Component (B), the electron-accepting compound, includes compounds having an active proton, pseudoacidic compounds (not an acid, but serves as an acid in the composition to develop color with Component (A)), and compounds having an electron hole.

The compounds having an active proton include compounds having a phenolic hydroxyl group including monophenols and polyphenols unsubstituted or substituted with alkyl, aryl, acyl, alkoxycarbonyl, carboxyl, esters and amides thereof, or halogen; phenol-aldehyde condensation resins such as bis type and tris type phenols. The compound having an active proton may be a metal salt of the above compound having a phenolic hydroxyl group.

The compounds having a phenolic hydroxyl group are exemplified specifically by phenol, o-cresol, t-butylcathecol, nonylphenol, n-octylphenol, n-dodecylphenol, n-stearylphenol, p-chlorophenol, p-bromophenol, o-phenylphenol,
4-[4-(1-methylethoxy)phenyl]sulfonylphenol,
4-(4-butyloxyphenyl)sulfonylphenol,
4-(4-pentyloxyphenyl)sulfonylphenol,
4-(4-hexyloxyphenyl)sulfonylphenol,
4-(4-heptyloxyphenyl)sulfonylphenol,
4-(4-octyloxyphenyl)sulfonylphenol,
n-butyl p-hydroxybenzoate, n-octyl p-hydroxybenzoate, resorcin, dodecyl gallate,
2,2-bis(4'-hydroxyphenyl)propane,
4,4-dihydroxydiphenyl sulfone,
1,1-bis(4'-hydroxyphenyl)ethane,
2,2-bis(4'-hydroxy-3-methylphenyl)propane,
bis(4-hydroxyphenyl) sulfide,
1-phenyl-1,1-bis(4'-hydroxyphenyl)ethane,
1,1-bis(4'-hydroxyphenyl)-3-methylbutane,
1,1-bis(4'-hydroxyphenyl)-2-methylpropane,
1,1-bis(4'-hydroxyphenyl)-n-hexane,
1,1-bis(4'-hydroxyphenyl)-n-heptane,
1,1-bis(4'-hydroxyphenyl)-n-octane,
1,1-bis(4'-hydroxyphenyl)-n-nonane,
1,1-bis(4'-hydroxyphenyl)-n-decane,
1,1-bis(4'-hydroxyphenyl)-n-dodecane,
2,2-bis(4'-hydroxyphenyl)butane,
2,2-bis(4'-hydroxyphenyl)ethyl propionate,
2,2-bis(4'-hydroxyphenyl)-4-methylpentane,
2,2-bis(4'-hydroxyphenyl)hexafluoropropane,
2,2-bis(4'-hydroxyphenyl)-n-heptane, and
2,2-bis(4'-hydroxyphenyl)-n-nonane.

The compounds having a phenolic hydroxyl group as mentioned above are most effective in the thermochromism, but the compounds having an active proton also includes aromatic carboxylic acid, $C_2$ to $C_5$ aliphatic carboxylic acids, and metal salts thereof; acidic phosphate esters, and metal salts thereof; and 1,2,3-triazole and derivatives thereof.

Component (B) includes also fluoroalcohol compounds such as
2-hydroxyhexafluoroisopropylbenzene,
1,3-bis(2-hydroxyhexafluoroisopropyl)benzene,
1,4-bis(2-hydroxyhexafluoroisopropyl)benzene,
1,3-bis(2-hydroxymethyl-hexafluoroisopropyl)benzene,
1,3-bis(3-hydroxy-1,1-bistrifluoromethylpropyl)benzene,
1,4-bis(2-hydroxymethyl-hexafluoroisopropyl)benzene,
1,4-bis(3-hydroxy-1,1-bistrifluoromethylpropyl)benzene,
2-hydroxymethyl-hexafluoroisopropylbenzene, and
3-hydroxy-1,1-bistrifluoromethylpropylbenzene.

Next is explained Component (C) which causes the electron exchange reaction reversibly between the aforementioned Components (A) and (B) in a specified temperature range. Component (C) includes alcohols, esters, ketones, ethers, and acid amides. When these Components A, B, C are enclosed in microcapsules and subjected to a second processing, component (C) having 10 or more carbon atoms are preferred for the stable retention of the components in the capsules since low-molecular compounds will evaporate out of the capsules at a high temperature treatment.

The effective alcohols include saturated aliphatic monohydric alcohols having 10 or more carbon atoms, such as decyl alcohol, undecyl alcohol, dodecyl alcohol, tridecyl alcohol, tetradecyl alcohol pentadecyl alcohol, hexadecyl alcohol, heptadecyl alcohol, octadecyl alcohol, eicosyl alcohol, and docosyl alcohol.

The effective esters are esters having 10 or more carbon atoms, including esters derived from any combination between an aliphatic, alicyclic, or aromatic monocarboxylic acid and an aliphatic, alicyclic, or aromatic monohydric alcohol; esters derived from any combination of an aliphatic, alicyclic, or aromatic polycarboxylic acid and an aliphatic, alicyclic, or aromatic monohydric alcohol; and esters derived from any combination of an aliphatic, alicyclic, or aromatic monocarboxylic acid and an aliphatic, alicyclic, or aromatic polyhydric alcohol. Specifically, the esters include ethyl caprylate, octyl caprylate, stearyl caprylate, myristyl caproate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-t-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-n-nonyl cebacate, dineopentyl ester of 1,18-octadecylmethylenedicarboxylic acid, ethyleneglycol dimyristate, propyleneglycol dilaurate, propyleneglycol distearate, hexyleneglycol dipalmitate, 1,5-pentanediol distearate, 1,2,6-hexanetriol trimyristate, 1,4-cyclohexanediol didecanoate, 1,4-cyclohexanedimethanol dimyristate, xylene glycol dicaprate, and xyleneglycol distearate.

The effective esters also include esters derived from a saturated fatty acid and a branched aliphatic alcohol; esters derived from an unsaturated or branched or substituted saturated fatty acid and a branched or C16 or more aliphatic alcohol.

Specifically the effective esters include 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethyhexyl stearate, 2-methylbutyl caproate, 2-methylbutyl caprylate, 2-methylbutyl caprate,
1-ethylpropyl palmitate, 1-ethylpropyl stearate,
1-ethylpropyl behenate, 1-ethylhexyl laurate,
1-ethylhexyl myristate, 1-ethylhexyl palmitate,
2-methypentyl caproate, 2-methylpentyl caprylate,
2-methylpentyl caprate, 2-methylpentyl laurate,
2-methylbutyl stearate,
3-methylbutyl stearate, 1-methylheptyl stearate,
2-methylbutyl behenate, 3-methylbutyl behenate,
1-methylheptyl stearate, 1-methylheptyl behenate,
1-ethylpentyl caproate, 1-ethylpentyl palmitate,
1-methylpropyl stearate, 1-methyloctyl stearate,
1-methylhexyl stearate, 1,1-dimethylpropyl laurate,
1-methylpentyl caprate, 2-methylhexyl palmitate,
2-methylhexyl stearate, 2-methylhexyl behenate,
3,7-dimethyloctyl laurate, 3,7-dimethyloctyl myristate,
3,7-dimethyloctyl palmitate, 3,7-dimethyloctyl stearate, 3,7-dimethyloctyl behenate, stearyl oleate, behenyl oleate, stearyl linoleate, behenyl linoleate,
3,7-dimethyloctyl erucate, stearyl erucate, isostearyl erucate, cetyl isostearate, stearyl isostearate,
2-methylpentyl 12-hydroxystearate, 2-ethylhexyl 18-bromostearate, isostearyl 2-ketomyristate, 2-ethylhexyl 2-fluoromyristate, cetyl butyrate, stearyl butyrate, and behenyl butyrate.

In order to provide greater hysteresis in color density-temperature relation (i.e. the color density changes more differently in the temperature elevation process and the temperature lowering process, and the curves showing the color change form a larger loop) to the color-memory thermochromism depending on temperature, effective esters include esters of a carboxylic acid having a $\Delta T$ value (difference between the melting point and the cloud point) in the range from 5° C. to 50° C., as disclosed by the inventors of the present invention (U.S. Pat. No. 4,720,301), such as carboxylic esters having a substituted aromatic ring in the molecule, esters derived from a carboxylic acid having an unsubstituted aromatic ring and an aliphatic alcohol having 10 or more carbon atoms, carboxylic acid esters having a cyclohexyl group in the molecule, esters derived from a fatty acid having 6 or more carbon atoms and unsubstituted aromatic alcohol or a phenol, esters derived from a fatty acid having 8 or more carbon atoms and a branched aliphatic alcohol, and esters derived from a dicarboxylic acid and an aromatic alcohol or a branched aliphatic alcohol. The specific examples of the esters include dibenzyl cinnamate, heptyl stearate, didecyl adipate, dilauryl adipate, dimyristyl adipate, dicetyl adipate, distearyl adipate, trilaurin, trimyristin, tristearin, dimyristin, and distearin.

The effective esters further include aliphatic fatty acid esters derived from an aliphatic monohydric alcohol having 9 or more odd-number carbon atoms and an aliphatic carboxylic acid having even-number carbon atoms, and fatty acid esters having 17 to 23 carbons derived from n-pentyl alcohol or n-heptyl alcohol and an aliphatic carboxylic acid having even-number carbon atoms from 10 to 16.

Specifically, the effective esters include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl icosanoate, n-undecyl icosanoate, n-tridecyl icosanoate, n-pentadecyl icosanoate, n-nonyl behenate, n-undecyl behenate, n-tridecyl behenate, and n-pentadecyl behenate.

The effective ketones are aliphatic ketones having totally 10 or more carbon atoms, including
2-decanone, 3-decanone, 4-decanone, 2-undecanone,
3-undecanone, 4-undecanone, 5-undecanone,
2-dodecanone,
3-dodecanone, 4-dodecanone, 5-dodecanone,
2-tridacanone, 3-tridecanone, 2-tetradecanone,
2-pentadecanone, 8-pentadecanone, 2-hexadecanone,
3-hexadecanone, 9-heptadecanone, 2-pentadecanone,
2-octadecanone, 2-nonadecanone, 10-nonadecanone,
2-eicosanone, 11-eicosanone, 2-heneicosanone,
2-docasanone, laurone, and stearone.

The effective ketones further include aryl alkyl ketones having 12 to 24 carbon atoms, such as
n-octadecanophenone, n-heptadecanophenone,
n-hexadacanophenone, n-pentadecanophenone,
n-tetradecanophenone, 4-n-dodecanoacetophenone,
n-tridecanophenone, 4-n-undecanoacetophenone,
n-laurophenone, 4-n-decanoacetophenone,
n-undecanophenone, 4-n-nonylacetophenone,
n-decanophenone, 4-n-octylacetophenone, n-nonaphenone,
4-n-heptylacetophenone, n-octanophenone,
4-n-hexylacetophenone, 4-n-cyclohexylacetophenone,
4-t-butylpropiophenone, n-heptaphenone,
4-n-pentylacetophenone, cyclohexyl phenyl ketone,
benzyl n-butyl ketone, 4-n-butylacetophenone,
n-hexanophenone, 4-isobutylacetophenone,
1-acetonaphthone, 2-acetonaphthone, and cyclopentyl phenyl ketone.

The effective ethers are aliphatic ethers having totally 10 or more carbon atoms, including dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

The effective acid amides include acetamide, propionamide, butyramide, caproamide, caprylamide, capramide, lauramide, myristamide, palmitamide, stearamide, behenamide, oleamide, erucamide, benzamide, caproanilide, caprylanilide, capranilide, lauranilide, myristanilide, palmitanilide, stearanilide, behenanilide, oleanilide, erucanilide, N-methylcaproamide, N-methylcaprylamide, N-methylcapramide, N-methyllauramide, N-methylmyristamide, N-methylpalmitamide, N-methylstearmide, N-methylbehenamide, N-methyloleamide, N-methylerucamide, N-ethyllauramide, N-ethylmyristamide, N-ethylpalmitamide, N-ethylstearmide, N-ethyloleamide, N-butyllauramide, N-butylmyristamide, N-butylpalmitamide, N-butylstearmide, N-butyloleamide, N-octyllauramide, N-octylmyristamide, N-octylpalmitamide, N-octylstearmide, N-octyloleamide, N-dodecyllauramide, N-dodecylmyristamide, N-dodecylpalmitamide, N-dodecylstearmide, N-dodecyloleamide, dilauramide, dimyristamide, dipalmitamide, distearmide, dioleamide, trilauramide, trimyristamide, tripalmitamide, tristearmide, trioleamide, succinamide, adipamide, glutaramide, malonamide, azelamide, maleamide, N-methylsuccinamide, N-methyladipamide, N-methylglutaramide, N-methylmalonamide, N-methylazelamide, N-ethylsuccinamide, N-ethyladipamide, N-ethylglutaramide, N-ethylmalonamide, N-ethylazelamide, N-butylsuccinamide, N-butyladipamide, N-butylglutaramide, N-buthylmalonamide, N-octyladipamide, and N-dodecyladipamide.

The reversible thermochromic composition of the present invention is a solubilized mixture comprising essentially the aforementioned components (A), (B), and (C). The ratio of the components depends on the concentrations, the color change temperature, the color change mode, and the respective components. Generally, for achieving the desired characteristics, the components are contained a ratio of one part of Component (A); 0.1 to 100 parts, preferably 0.1 to 50 parts of Component (B); 5 to 100 parts of Component (C) based on weight.

The reversible thermochromic composition of the present invention may contain a photostabilizer at a content ranging from 0.3 to 24% by weight, preferably from 0.8 to 16% by weight to prevent the light deterioration of the thermochromic composition comprising Components (A), (B), and (C). An ultraviolet absorber as the photostabilizer intercepts ultraviolet light effectively to prevent light deterioration caused by a light-excited state of Component (A). An antioxidant, a singlet oxygen quencher, a superoxide anion quencher, or an ozone quencher inhibits oxidation reaction. An infrared absorber also serves as a photostabilizer. The photostabilizer may be used singly or in combination of two or more thereof.

The photostabilizer (Component (D)) applicable in the present invention is described below specifically.

The ultraviolet absorber includes benzophenone type ultraviolet absorbers such as
2,4-hydroxybenzophenone,
2-hydroxy-4-methoxybenzophenone,
2,2'-dihydroxy-4,4'-dimethoxybenzophenone,
2,2',4,4'-tetrahydroxybenzophenone,
2-hydroxy-4-methoxybenzophenone-5-sulfonic acid,
2-hydroxy-4-octoxybenzophenone,
bis(2-methoxy-4-hydroxy-5-benzoylphenyl)methane,
2-(2'-hydroxy-3',5'-di-t-amylphenyl)benzophenone,
2-hydroxy-4-dodecyloxy-benzophenone (trade name: Shisorb 103, Shipro Kasei K.K.),
2-hydroxy-4-octadecyloxybenzophenone,
2,2'-dihydroxy-4-methoxybenzophenone,
2-hydroxy-4-benzyloxybenzophenone, and
  salicylic acid type ultraviolet absorber such as phenyl salicylate,
p-t-butylphenyl salicylate,
p-octylphenyl salicylate,
2,4-di-t-butylphenyl 4-hydroxybenzoate,
1-hydroxybenzoate,
1-hydroxy-3-t-butyl benzoate,
1-hydroxy-3-t-octyl benzoate, and
resorcinol monobenzoate;
  cyanoacrylate type ultraviolet absorbers such as ethyl 2-cyano-3,3'-diphenylacrylate,
2-ethylhexyl 2-cyano-3,3'-diphenylacrylate,
2-ethylhexyl 2-cyano-3-phenylcinnamate;
  benzotriazole type ultraviolet absorbers such as 2-(5-t-butyl-2-hydroxyphenyl)-benzotriazole (Trade name: Tinuvin-PS, Ciba Geigy Co.),
2-(5-methyl-2-hydroxyphenyl)-benzotriazole,
2-[2-hydroxy-3,5-bis(a,a-dimethylbenzyl)phenyl]-2H-benzotriazole,
2-(3,5-di-t-butyl-2-hydroxyphenyl)-benzotriazole,
2-(3-t-butyl-5-methyl-2-hydroxyphenyl)-5-chlorobenzotriazole,
2-(3,5-di-t-butyl-2-hydroxyphenyl)-5-chlorobenzotriazole,
2-(3,5-di-t-amyl-2-hydroxyphenyl)-benzotriazole (Trade name: Tinuvin 328, Ciba Geigy Co.),
methyl-3-[3-t-butyl-5-(2H-benzotriazole-2-yl)-4-hydroxyphenyl]propionate-polyethyleneglycol MW 300) (Trade name: Tinuvin 1130, Ciba Geigy Co.),
2-(3-dodecyl-5-methyl-2-hydroxyphenyl)- benzotriazole,
methyl-3-[3-(2H-benzotriazole-2-yl)-5-t-butyl-4-hydroxyphenyl] propionate-polyethyleneglycol MW 300),
2-(3-t-butyl-5-propyloctylate-2-hydroxyphenyl)-5-chlorobenzotriazole,
2-[2-hydroxyphenyl-3,5,-di-(1,1'-dimethylbenzyl)phenyl]-2H-benzotriazole,
2-(2-hydroxy-5-t-octylphenyl)-2H-benzotriazole,
2-(3-t-butyl-5-octyloxycarbonylethyl-2- hydroxyphenyl)-benzotriazole (Trade name: Tinuvin 384, Ciba Geigy Co.),
2-(2-hydroxy-5-tetraoctylphenyl)-benzotriazole,
2-(2-hydroxy-4-octoxyphenyl)-benzotriazole,
2-[2'-hydroxy-3'-(3",4",5",6"-tetrahydrophthalimidomethyl)-5'-methylphenyl]-benzotriazole, and
2-(2-hydroxy-5-t-butylphenyl)-benzotriazole;
  oxalanilide type ultraviolet absorbers such as ethanediamide-N-(2-ethoxyphenyl)-N'-(4-isododecylphenyl), and
2,2,4,4-tetramethyl-20-(β-lauryloxycarbonyl)-ethyl- 7-oxa-3,20-diazadispiro(5,1,11,2)heneiconic acid-21-one.

The antioxidant includes hindered amine type antioxidants, phenol type antioxidants, sulfur type antioxidants, phosphoric acid type antioxidants.

The hindered amine type antioxidants include dimethyl succinate/1-(2-hydroxyethyl)-4-hydroxy-2,2,6,6-tetramethylpiperidine polycondensate,
poly[{6-(1,1,3,3-tetramethylbutyl)imino-1,3,5-triazine-2,4-diyl}{(2,2,6,6-tetramethyl-4-piperidyl)imino}],
bis(1,2,2,6,6-pentamethyl-4-piperidyl) 2-(3,5-di-t-butyl-4-hydroxybenzyl)-2-n-butylmalonate,
N,N'-bis(3-aminopropyl)ethylenediamine/2,4-bis[N-butyl-N-(1,2,2,6,6-pentamethyl-4-piperidyl)amino]-6-chloro-1,3,5-triazine condensate,
bis(1,2,2,6,6-pentamethyl-4-piperidyl) sebacate,
4-benzoyloxy-2,2,6,6-tetramethylpiperidine,
bis(2,2,6,6-tetramethyl-4-piperidyl) sebacate, and 8-acetyl-3-dodecyl-7,7-9,9-tetramethyl-1,3,8-triazaspiro[4.5]decane-2,4-dione.

The phenol type antioxidants specifically include
2,6-di-t-butyl-4-methylphenol,
2-t-butyl-4-methoxyphenol,
2,6-di-t-butyl-4-ethylphenol,
octadecyl-3-(3,5-di-t-butyl-4-hydroxyphenyl) propionate,
2,2-methylenebis(4-methyl-6-t-butylphenol),
4,4-thiobis(2-methyl-6-t-butylphenol),
2,2-thiobis(4-methyl-6-t-butylphenol),
4,4-butylidenebis(3-methyl-6-t-butylphenol),
3,9-bis[1,1-dimethyl-2-[β-(3-t-butyl-4-hydroxy-5-methylphenyl)propionyloxy]ethyl]-2,4,8,10-tetraoxaspiro[5.5]-undecane,
1,1,3-tris(2-methyl-4-hydroxy-5-t-butylphenyl)butane,
1,3,5-trimethyl-2,4,6-tris(3,5-di-t-butyl-4-hydroxybenzyl) benzene, tetrakis[methylene-3-(3,5-di-t-butyl-4-hydroxyphenyl) propionate]-methane,
2,2-ethylenebis(4,6-di-t-butylphenol),
bis[3,3'-bis-(4'-hydroxy-3'-t-butylphenyl)butyric acid] glycol ester,
1,3,5-tris(3',5'-di-t-butyl-4'-hydroxybenzyl)-s-triazine-2,4,6-(1H,3H,5H)-trione, tocophenol,
1,3,5-tris(4-t-butyl-3-hydroxy-2,6-dimethylbenzyl) isocyanurate,
pentaerythritol tetrakis(3-laurylthiopropionate),
triethyleneglycol-bis[3-(3-t-butyl-5-methyl-4-hydroxyphenyl)propionate],
1,6-hexanediol-bis[3-(3,5-di-t-butyl-4-hydroxyphenyl) propionate],
2,2-thioethylenebis[3-(3,5-di-t-butyl-4-hydroxyphenyl) propionate],
N,N-hexamethylenebis(3,5-t-butyl-4-hydroxy-hydrocinnamide),
tris(3,5-di-t-butyl-4-hydroxybenzyl)isocyanurate,
2,2,4-trimethyl-1,2-hydroquinone, styrate-phenol,
2,5-di-t-butylhydroquinone, and bis(2,2,6,6-tetramethyl-4-piperidyl) sebacate.

The sulfur type antioxidant specifically includes
dilauryl 3,3'-thiodipropionate,
dimyristyl 3,3'-thiodipropionate,
distearyl 3,3'-thiodipropionate, and
stearylthiopropylamide.

The phosphoric acid type antioxidants specifically include
tris(2,4-di-t-butylphenyl) phosphite,
bis(2,4-di-t-butylphenyl)pentaerythritol diphosphite,
3,5-di-t-butyl-4-hydroxy-benzyl phosphanate diethyl ester,
triphenyl phosphite,
diphenyl isodecyl phosphite,
phenyl isodecyl phosphite,
4,4'-butyridene-bis(3-methyl-6-t-butylphenylditridecyl) phosphite,
octadecyl phosphite,
tris(nonylphenyl) phosphite,
diisodecylpentaerythritol diphosphite,
9,10-dihydro-9-oxa-10-phosphaphenanthrene,
10-(3,5-di-t-butyl-4-hydroxybenzyl)-9,10-dihydro-9-oxa-10-phosphaphenanthrene-10-oxide,
10-decyloxy-9,10-dihydro-9-oxa-10-phosphaphenanthrene,
cyclic neopentatetrayl-bis(2,4-di-t-butylphenyl) phosphite,
cyclic neopentantetrayl-bis(2,6-di-t-butyl-4-methylphenyl) phosphite,
2,2-methylenebis(4,6-di-t-butylphenyl)octyl phosphite,
2,4-bis(n-octylthio)-6-(4-hydroxy-3,5-di-t-butylanilino)-1,3,5-triazine, and
octylated diphenylamine.

The effective singlet oxygen quencher includes carotins, dyes, amines, phenols, nickel complexes, and sulfides, such as 1,4-diazabicyclo[2.2.2]octane (DABCO), β-carotin, 1,3-cyclohexadiene, 2-diethylaminomethylfuran, 2-phenylaminomethylfuran, 9-diethylaminomethylanthracene, 5-diethylaminomethyl-6-phenyl-3,4-dihydroxypyrane,
nickel dimethyldithiocarbamate, nickel 3,5-di-t-butyl-4-hydroxybenzyl-O-ethyl phosphonate,
nickel 3,5-di-t-butyl-4-hydroxybenzyl-O-butyl phosphonate,
nickel[2,2'-thio-bis(4-t-octylphenolate)](n-butylamine),
nickel[2,2'-thio-bis(4-t-octylphenolate)](2-ethylhexylamine),
nickel bis[2,2'-thio-bis(4-t-octylphenolate)],
nickel bis[2,2'-sulfone-bis(4-t-octylphenolate)],
nickel bis(2-hydroxy-5-methoxyphenyl-N-n-butylaldoimine),
nickel bis(dithiobenzyl), and nickel bis(dithiobiacetyl).

The superoxide anion quencher includes cobalt or nickel complexes of superoxide dismutase, and the like.

The effective ozone quencher includes
4,4'-thiobis(6-t-butyl-m-cresol),
2,4,6-tri-t-butylphenol,
1,4-diazabicyclo[2.2.2]octane,
N-phenyl-β-naphthylamine, α-tocopherol,
4,4'-methylene-bis(2,6-di-t-butylphenol),
p,p'-diaminodiphenylmethane,
2,2'-methylene-bis(6-t-butyl-p-cresol),
N,N'-diphenyl-p-phenylenediamine,
N,N-diphenylethylenediamine, and
N-isopropyl-N'-phenyl-p-phenylenediamine.

The effective infrared absorber is a compound having a maximum absorption band in the near-infrared region from 700 to 2000 nm and exhibiting no or little absorption in the visible region of 400 to 700 nm. The examples of the compound are shown by the chemical formulas below.

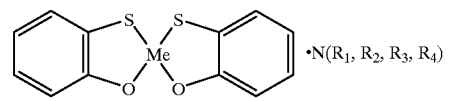

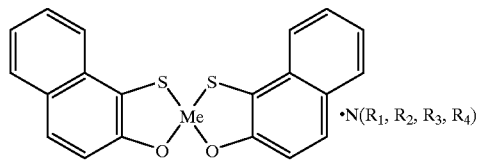

where $R_1$, $R_2$, $R_3$, and $R_4$ are respectively an alkyl group; and Me is nickel, palladium, or platinum,

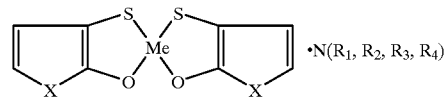

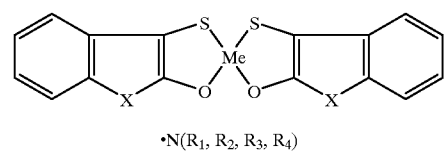

where $R_1$, $R_2$, $R_3$, and $R_4$ are respectively an alkyl group; Me is nickel, palladium, or platinum; and X is a carbon, oxygen, or sulfur atom,

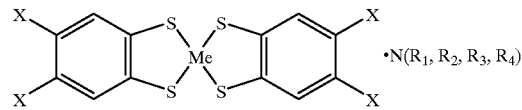

where $R_1$, $R_2$, $R_3$, and $R_4$ are respectively an alkyl group; X is a halogen or hydrogen atom; and Me is nickel, palladium, or platinum,

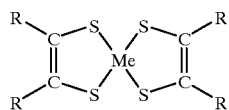

where R is any of a hydrogen atom, an alkyl group, a phenyl group, an alkyl- or alkoxy-substituted phenyl group, and a thienyl group; Me is nickel, palladium, or platinum, and

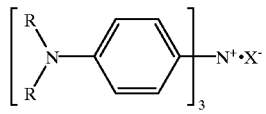

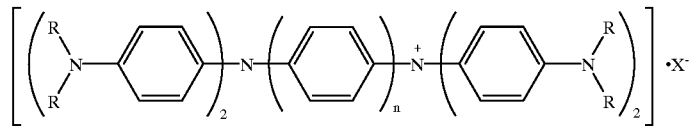

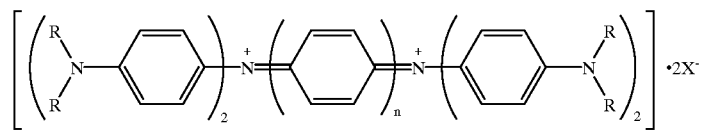

where R is an alkyl group, X is an anion selected from the group of anions of perchlorate ($ClO_4^-$), fluoroborate ($BF_4^-$), trichloroacetate ($Cl_3COO^-$), trifluoroacetate ($CF_3COO^-$), picrate ($[(NO_3)_3C_6H_2O^-]$, hexafluoroarsenate ($AsF_6^-$), hexachloroantimonate ($SbCl_6^-$), hexafluoroantimonate ($SbF_6^-$), benzenesulfonate ($C_6H_5SO_3^-$), alkylsulfonate ($RSO_3^-$), phosphate ($PO_4^{3-}$), sulfate ($SO_4^{2-}$), chloride ($Cl^-$), and bromide ($Br^-$).

The reversible thermochromic composition of the present invention is useful by itself. However, it is preferably enclosed in microcapsules and used as a microcapsule pigment to exhibit the effects constantly keeping its components in the same state irrespective of the application conditions. The composition is stabilized chemically and physically by microencapsulation. For practical use, the size of the microcapsules is in the range from 0.1 to 100 µm, preferably from 1 to 50 µm, more preferably from 2 to 30 µm.

The microencapsulation can be conducted by a conventional process such as interfacial polymerization, in-situ polymerization, cure-in liquid coating, phase separation from an aqueous solution, phase separation from an organic solvent, melt-dispersion cooling, air-suspension coating, spray drying, and so forth. A suitable precess may be selected depending on the application field. The surface of the microcapsule may be covered with a secondary resin film for durability and for improvement of the surface properties for practical application.

In microencapsulation of the reversible thermochromic composition, the photostabilizer may be enclosed together with the reversible thermochromic composition, or may be added externally to the vehicle of the coloring material. Otherwise the photostabilizer may be enclosed in the microcapsules and supplementally added to the vehicle.

The reversible thermochromic composition dispersed in a vehicle containing a resin binder forms a coloring layer. Non-thermochromic dye or pigment may be added in an appropriate amount to bring about various color change to the coloring layer.

The reversible thermochromic composition of the present invention in a dispersion state in a vehicle is useful as a printing ink or paint for printing or coating on a supporting medium such as paper, cloth, leather, and plastics. It is also useful for writing characters or drawings on a supporting medium in a form of a writing ink, solid writing material like crayon, and oil or water color.

The reversible thermochromic composition of the present invention may be dispersed in a resin and molded into molded articles, films, sheets, filaments, or the like.

Thus the reversible thermochromic composition of the present invention is applicable to toys, ornaments, teaching materials, stationery, textiles, household articles, sporting goods, outdoor and indoor equipment, clothes, printed matters, and so forth.

EXAMPLES 1–14

Table 1 shows Components (A), (B), and (C), the ratio thereof (by weight), the color change, and the color change temperature of the reversible thermochromic compositions of the present invention. In Examples and Comparative Examples, the unit "parts" is based on weight.

TABLE 1

| Example No. | Components (weight parts) | | | Color change | | |
|---|---|---|---|---|---|---|
| | (A)* | (B) | (C) | | Change temperature | |
| 1 | A-1 (0.5) | 2,2-Bis(4'-hydroxyphenyl)-propane (5) | Myristyl alcohol (25) Butyl stearate (25) | Pink | ← → 15° C. | Colorless |

TABLE 1-continued

| Example No. | (A)* | (B) | (C) | Color change | | Change temperature |
|---|---|---|---|---|---|---|
| 2 | A-2 (0.2) | Lauryl gallate (5) | Butyl myristate (50) | Pink | ← → | Colorless |
| | | | | | −18° C. | |
| 3 | A-3 (0.3) | Bis(4-hydroxyphenyl)sulfide (7) | n-Stearyl alcohol (50) | Pink | ← → 50° C. | Colorless |
| 4 | A-4 (0.6) | 2,2-Bis(4'-hydroxyphenyl)-hexafluoropropane (6) | Stearyl caprate (50) | Pink (fluorescent) | ← → | Colorless 30° C. |
| 5 | A-5 (0.5) | 2,2'-Methylenebis(4-chlorophenol) (5) | Neopentyl stearate (50) | Pink 15° C. | ← → | Colorless 32° C. |
| 6 | A-6 (0.5) | Bis(4-hydroxyphenyl)-sulfone (4) | Nonyl caprate (50) | Pink −7° C. | ← → | Colorless 12° C. |
| 7 | A-7 (0.5) | Tetrabromobisphenol (5) | 2-Ethylhexyl caprate (50) | Pink | ← → −30° C. | Colorless |
| 8 | A-8 (0.5) | 2,2-Bis(4'-hydroxyphenyl)-4-methylpentane (5) | Trilaurin (50) | Red 10° C. | ← → | Colorless 40° C. |
| 9 | A-9 (0.5) | 2,2'-Methylenebis(3,4,6-trichlorophenol) (5) | 1,10-Decanediol (50) | Red | ← → 70° C. | Colorless |
| 10 | A-10 (0.3) | 2,2'-Methylenebis(4-chlorophenol) (4) | Stearyl butyrate (50) | Pink | ← → 20° C. | Colorless |
| 11 | A-11 (0.5) | 2,2-Bis(4'-hydroxyphenyl)-butane (5) | 9-heptadecanone (25) Cetyl alcohol (25) | Pink | ← → 35° C. | Colorless |
| 12 | A-12 (1.0) | 1,1-Bis(4'-hydroxyphenyl)-n-decane (8) | Neopentyl stearate (50) | Pink 15° C. | ← → | Colorless 32° C. |
| 13 | A-13 (0.5) | 1,3-Bis(2-hydroxyhexafluoro-isopropyl)benzene (6) | Stearyl caprate (50) | Red (fluorescent) | ← → | Colorless 30° C. |
| 14 | A-14 (0.5) | 2,2-Bis(4'-hydroxyphenyl)-hexafluoropropane (5) | 8-Pentadecanone (50) | Pink (reddish) 10° C. | ← → | Colorless 36° C. |

*Component (A)
A-1: Spiro[5H-(1)benzopyrano(2,3-d)pyrimidine-5,1'(3'H)isobenzofuran]-3'-one, 2-(dimethylamino)-8-(dimethylamino)-4-methyl-
A-2: Spiro[5H-(1)benzopyrano(2,3-d)pyrimidine-5,1'(3'H)isobenzofuran]-3'-one, 2-(diethylamino)-8-(diethylamino)-4-methyl-
A-3: Spiro[5H-(1)benzopyrano(2,3-d)pyrimidine-5,1'(3'H)isobenzofuran]-3'-one, 2-(di-n-butylamino)-8-(di-n-butylamino)-4-methyl-
A-4: Spiro[5H-(1)benzopyrano(2,3-d)pyrimidine-5,1'(3'H)isobenzofuran]-3'-one, 2-(di-n-butylamino)-8-(diethylamino)-4-methyl-
A-5: Spiro[5H-(1)benzopyrano(2,3-d)pyrimidine-5,1'(3'H)isobenzofuran]-3'-one, 2-(di-n-butylamino)-8-(N-ethyl-N-isoamylamino)-4-methyl-
A-6: Spiro[5H-(1)benzopyrano(2,3-d)pyrimidine-5,1'(3'H)isobenzofuran]-3'-one, 2-(di-n-butylamino)-8-(n-octylamino)-4-methyl-
A-7: Spiro[5H-(1)benzopyrano(2,3-d)pyrimidine-5,1'(3'H)isobenzofuran]-3'-one, 2-(piperidino)-8-(diethylamino)-4-methyl-
A-8: Spiro[5H-(1)benzopyrano(2,3-d)pyrimidine-5,1'(3'H)isobenzofuran]-3'-one, 2-(diethylamino)-8-(diethylamino)-
A-9: Spiro[5H-(1)benzopyrano(2,3-d)pyrimidine-5,1'(3'H)isobenzofuran]-3'-one, 2-(N-ethyl-N-isoamylamino)-8-(N-ethyl-N-isoamylamino)-
A-10: Spiro[5H-(1)benzopyrano(2,3-d)pyrimidine-5,1'(3'H)isobenzofuran]-3'-one, 2-(dibutylamino)-8-[(4-chlorophenyl)amino)]-4-phenyl-
A-11: Spiro[5H-(1)benzopyrano(2,3-d)pyrimidine-5,1'(3'H)isobenzofuran]-3'-one, 2-(di-n-butylamino)-8-(diethylamino)-4-methyl-7-methyl-
A-12: Spiro[5H-(1)benzopyrano(2,3-d)pyrimidine-5,1'(3'H)isobenzofuran]-3'-one, 2-(di-n-butylamino)-8-(diethylamino)-4-methyl-
A-13: Spiro[5H-(1)benzopyrano(2,3-d)pyrimidine-5,1'(3'H)isobenzofuran]-3'-one, 2-(di-n-butylamino)-8-(di-n-butylamino)-4-phenyl-
A-14: Spiro[5H-(1)benzopyrano(2,3-d)pyrimidine-5,1'(3'H)isobenzofuran]-3'-one, 2-(di-n-butylamino)-8-(N-ethyl-N-isoamylamino)-4-phenyl- EXAMPLE 15
Preparation of Reversible Thermochromic Composition Enclosed in Microcapsules In 70 parts of the composition prepared in Example 4, was dissolved 10 parts of Epon 828 (Epoxy resin, Yuka Shell Epoxy K. K.) by heating to 100° C. This solution was added dropwise into 100 parts of an aqueous 10% gelatin solution with stirring to form fine droplets of the added solution. Separately, 5 parts of Hardener U (epoxy resin-amine adduct, Yuka Shell Epoxy K. K.) was dissolved in 45 parts of water. This solution of the hardener was added gradually to the above solution with stirring. The mixture was stirred for about 5 hours at a temperature of 80° C. to obtain a microcapsule liquid suspension. The microcapsule pigment collected by centrifugation of the microcapsule suspension developed a fluorescent bright pink color below 30° C., and turned colorless at 30° C. or higher temperature. This change was reversible.

EXAMPLE 16
Preparation of Reversible Thermochromic Composition Enclosed in Microcapsules A microcapsule pigment was prepared with the composition derived in Example 5 in the same manner as in Example 15. The obtained microcapsule pigment developed a bright pink color when cooled to 15° C. or lower, this colored state being retained at a temperature below 32° C. When heated to 32° C. or higher, the microcapsule pigment lost the pink color to become colorless, this colorless state being retained at a temperature higher than 15° C. The color change could be caused repeatedly.

EXAMPLE 17
Preparation of Reversible Thermochromic Composition Enclosed in Microcapsules A microcapsule pigment was prepared with the composition derived in Example 12 in the same manner as in Example 15. Similarly as the composition obtained in Example 12, the obtained microcapsule pigment developed a bright pink color when cooled to 15° C. or lower, this color tone being retained at a temperature below 32° C. When heated to 32° C. or higher, the microcapsule pigment lost the pink color and became colorless, this colorless state being retained at a temperature higher than 15° C. The color change could be caused repeatedly.

Test of Light-Fastness

An ink was prepared by mixing 10 parts of the reversible thermochromic composition obtained in Example 1 as the colorant and 90 parts of a vehicle. Another ink was prepared by mixing 20 parts of the microcapsule pigment obtained in Example 15 and 80 parts of a vehicle. Other three inks were prepared as described in Examples 18, 19, and 20 below. Test samples were obtained by printing on a synthetic paper sheet with each ink.

EXAMPLE 18

An ink was prepared by adding 10 parts of the composition prepared in Example 1, 0.5 parts of propane dioic acid[[3,5-bis(1,1-dimethylethyl)-4-hydroxphenyl]methyl] butyl-bis(1,2,2,6,6-pentamethyl-4-piperidinyl)ester and 1.0 parts of 2-(5-t-butyl-2-hydroxyphenyl)benzotriazole to 88.5 parts of a vehicle. Printing was conducted with this ink on a synthetic paper sheet to obtain a test sample.

EXAMPLE 19

2.0 Parts of 2-(5-t-butyl-2-hydroxyphenyl)-benzotriazole as a photostabilizer, and 70 parts of the composition prepared in Example 4 were enclosed in microcapsules. An ink was prepared by adding 20 parts of this microcapsule pigment as the colorant to 80 parts of a vehicle. Printing was conducted with this ink on a synthetic paper sheet to obtain a test sample.

EXAMPLE 20

An ink was prepared by adding 19.5 parts of the microcapsule pigment obtained in Example 19, and 2.9 parts of 2-(3,5-di-t-amyl-2-hydroxyphenyl)-benzotriazole to 77.6 parts of a vehicle. Printing was conducted with this ink on a synthetic paper sheet to obtain a test sample.

Before light exposure, the light absorbance of the above printed matters in both the colored and decolored states was measured at the maximum absorption wavelength by means of a spectrophotometer (manufactured by Hitachi, Ltd.). The difference between the absorbance at the colored state and at the decolored state were taken as 100% density for the respective samples. The test samples were subjected to light exposure test by means of a carbon-arc fademeter. At 0, 4, 8, 12, 16, and 20 hours of light exposure, the absorbance at the colored state of the test samples were measured, and degrees of the lowering of the density relative to the 100% density were calculated. Table 2 shows the results of the light fastness test.

TABLE 2

| Example No. | Light fastness (Fademeter, hours) | | | | | |
|---|---|---|---|---|---|---|
| | 0 | 4 | 8 | 12 | 16 | 20 |
| 1 | 100 | 94 | 85 | 74 | 65 | 57 |
| 15 | 100 | 95 | 86 | 75 | 64 | 55 |
| 18 | 100 | 97 | 92 | 88 | 82 | 78 |
| 19 | 100 | 98 | 93 | 86 | 81 | 77 |
| 20 | 100 | 98 | 94 | 90 | 87 | 85 |

COMPARATIVE EXAMPLE 1

A reversible thermochromic composition was prepared in the same manner as in Example 1 except that Component A was replaced by 0.5 parts of spiro[12H-benzo[α]xanthene-12,1'(3'H)-isobenzofuran]-3'one, 9-(diethylamino)-.

The composition developed a bluish pink color at a temperature lower than 15° C., the color being dark, and not bright.

COMPARATIVE EXAMPLE 2

A reversible thermochromic composition was prepared in the same manner as in Example 1 except that Component A was changed to 0.5 parts of spiro[isobenzofuran-1(3H),9' [9H]xanthene]-3-one, 3',6'-bis(di-n-butylamino)-.

The composition developed a clear but bluish pink color at a temperature lower than 15° C. The color remains remarkably at a temperature of 15° C. or higher.

APPLICATION EXAMPLE 1

A screen process ink was prepared by uniformly mixing 43.0 parts of a microcapsule pigment enclosing the reversible thermochromic composition prepared in Example 15 with agitation into a vehicle composed of 50.0 parts of ethylene-vinyl acetate resin emulsion, 3.0 parts of an anti-foaming agent, 1.0 parts of a thickening agent (sodium alginate), 3.0 parts of a leveling agent, 1.0 part of an antiseptic agent.

(Parts are based on weight).

A reversible thermochromic sheet was prepared by printing with the above screen process ink through a 150-mesh polyester screen on a support to form a reversible thermochromic layer. The support had been made of a white synthetic paper film of 80 μm thick, and a polyethylene foam layer of 1 mm thick attached to the film by an adhesive layer. The reversible thermochromic sheet assumed a white color at 30° C. or higher, and developed a clear pink color when cooled below 30° C.

APPLICATION EXAMPLE 2

An aqueous ball-point pen ink was produced by dispersing 44.0 parts (solid matter content: 27.3%) of a microcapsule pigment enclosing the reversible thermochromic composition prepared in Example 15 in 56.0 parts of an aqueous vehicle containing a shear-thinning agent.

Using a ball-point pen filled with the above ball-point pen ink characters were written on a writing paper sheet. Thereby, pink-colored writings were obtained with satisfactory smooth start. In the test of thermochroism, the writing developed a clear pink color when cooled below 30° C., and became colorless when heated to 30° C. or higher.

APPLICATION EXAMPLE 3

A reversible thermochromic aqueous spray paint was produced by dispersing uniformly 30.0 parts of a microcapsule pigment enclosing the reversible thermochromic composition prepared in Example 16 in a vehicle composed of 45.0 parts of an acrylate ester resin emulsion, 1.5 parts of a water-dispersible photostabilizer (trade name: Ciba Tex LFN, Japan Ciba Geigy Co.), 1.0 parts of an anti-foaming agent, and 22.5 parts of diluting water, and subsequently filtering the dispersion through 180-mesh stainless screen.

A reversible thermochromic cloth was obtained by spraying the above aqueous spraying paint onto a white lace cloth, and drying it to form a reversible thermochromic layer.

A reversible thermochromic dress for a doll was prepared by sewing the above cloth. The doll dress developed a clear pink color when cooled to 15° C. or lower, and this color was retained at a temperature lower than 32° C. The doll dress became white when heated to 32° C. or higher, and this white color state was retained at a temperature higher than 15° C. The color change could be caused repeatedly.

APPLICATION EXAMPLE 4

Reversible thermochromic pellets were prepared by mixing uniformly 20 parts of a microcapsule pigment enclosing the reversible thermochromic composition prepared in Example 16, 2 parts of a benzotriazole type ultraviolet absorber, and 1000 parts of polypropylene having a Vicat softening point of 100° C., and pelletizing the mixture by means of an extrusion-molding machine at a cylinder temperature of 165° C. and at a gate temperature of 160° C.

From the above reversible thermochromic pellets, a miniature car body having a thickness of 3 mm, a length of 10 cm, and a width of 3.7 cm was molded by an injection molding machine at a cylinder temperature of 170° C. The miniature car body developed a clear pink color when cooled to 15° C. or lower, and this color was retained at a temperature lower than 32° C. The miniature car body became colorless when heated to 32° C. or higher, and this colorless state was retained at a temperature higher than 15° C. The color change could be caused repeatedly.

APPLICATION EXAMPLE 5

Reversible thermochromic 12-nylon pellets were prepared by mixing 50.0 parts of a microcapsule pigment containing the reversible thermochromic composition prepared in Example 17, 1000 parts of 12-nylon resin (mp: 178° C.), and 10.0 parts of 2-3(-t-butyl-5-octyloxycarbonylethyl-2-hydroxyphenyl)-benzotriazole, dispersing uniformly the mixture by a Henschel mixer, and molding by an extrusion molding machine at a cylinder temperature of 190° C. and a tip die temperature of 200° C.

From the above molding resin composition, a reversible thermochromic filament was produced by melt spinning at a cylinder temperature of 190° C. and a die temperature of 200° C.

The filaments was implanted onto the head of a doll as the doll hair.

The reversible thermochromic filament developed a clear pink color when cooled to 15° C. or lower, and this color was retained at a temperature lower than 32° C. The reversible thermochromic filament became colorless when heated to 32° C. or higher, and this colorless state was retained at a temperature higher than 15° C. The color change could be caused repeatedly.

What is claimed is:

1. A reversible thermochromic composition containing (A) a diazarhodamine lactone derivative represented by General Formula (1) below as an electron-donating color-developing organic compound, (B) an electron-accepting compound, and (C) a reaction medium for causing an electron exchange reaction between the diazarhodamine lactone derivative (A) and the electron-accepting compound (B) reversibly at a specified temperature range:

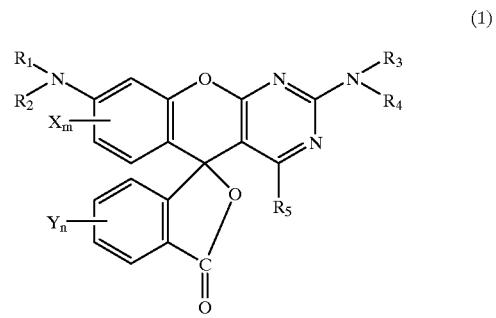

(1)

where $R_1$ and $R_2$ are independently hydrogen, $C_1$–$C_8$ alkyl or hydroxy alkyl, $C_2$–$C_{12}$ alkoxyalkyl, $C_4$–$C_{11}$ carboalkoxyalkyl, phenyl, $C_7$–$C_{12}$ phenylalkyl, or phenyl substituted with chlorine, bromine, or $C_1$–$C_4$ alkyl or alkoxy; $R_3$ and $R_4$ are independently hydrogen, $C_1$–$C_8$ alkyl, $C_5$–$C_7$ cycloalkyl or hydroxyalkyl, $C_2$–$C_{12}$ alkoxyalkyl, $C_4$–$C_{11}$ carboalkoxyalkyl, or $C_7$–$C_{12}$ phenylalkyl; $R_1$ and $R_2$, and $R_3$ and $R_4$ may form together a ring; $R_5$ is $C_1$–$C_3$ alkyl, $C_1$–$C_4$ alkoxy, phenyl, or phenyl substituted with chlorine, bromine, or $C_1$–$C_4$ alkyl or alkoxy; X and Y are independently chlorine, or $C_1$–$C_3$ alkyl, hydroxyalkyl, or halogenalkyl; m is an integer of 0 to 3; and n is an integer of 0 to 4.

2. The reversible thermochromic composition according to claim 1, wherein Component (B) is a compound having a phenolic hydroxyl group or a metal salt thereof, and Component (C) is a compound selected from alcohols, esters, ketones, ethers, and acid amides.

3. The reversible thermochromic composition according to claim 1 or 2, wherein one or more photostabilizer is added which is selected from ultraviolet absorbers, antioxidants, singlet oxygen quenchers, superoxide anion quenchers, ozone quenchers, and infrared absorber.

4. The reversible thermochromic composition according to claim 1 or 2, wherein the composition is enclosed in microcapsules.

5. The reversible thermochromic composition according to claim 3, wherein the composition is enclosed in microcapsules.

* * * * *

UNITED STATES PATENT AND TRADEMARK OFFICE
CERTIFICATE OF CORRECTION

PATENT NO.   : 6,048,387
DATED        : April 11, 2000
INVENTOR(S)  : YUTAKA SHIBAHASHI ET AL.          Page 1 of 2

It is certified that error appears in the above-identified patent and that said Letters Patent is hereby corrected as shown below:

COLUMN 2:

Line 14, "compounds" should read --compound--.

COLUMN 3:

Line 16, "-4-methyl-;" should read ---4-methyl-,--.

COLUMN 5:

Line 10, "five-to" should read --five- to--;
   Line 12, "is" should read --as--; and
   Line 19, "pseudoacidic" should read --pseudo-acidic--.

COLUMN 6:

Line 28, "alcohol pentadecyl" should read
           --alcohol, pentadecyl--.

COLUMN 7:

Line 30, "more" should be deleted; and
   Line 31, "differently in" should read
           --are greater between--.

COLUMN 9:

Line 9,  "N-buthylmalonamide," should read
           --N-butylmalonamide,--; and
   Line 17, "contained" should read --contained in--.

UNITED STATES PATENT AND TRADEMARK OFFICE
CERTIFICATE OF CORRECTION

PATENT NO.   : 6,048,387
DATED        : April 11, 2000
INVENTOR(S)  : YUTAKA SHIBAHASHI ET AL.

It is certified that error appears in the above-identified patent and that said Letters Patent is hereby corrected as shown below:

COLUMN 13:

Line 57, "precess" should read --process--.

COLUMN 17:

Line 27, "2.0 Parts" should read --2.0 parts--.

COLUMN 19:

Line 41, "filaments" should read --filament--.

COLUMN 20:

Line 41, "photostabilizer" should read --photostabilizers--.

Signed and Sealed this

Twenty-second Day of May, 2001

Attest:

NICHOLAS P. GODICI

*Attesting Officer*   *Acting Director of the United States Patent and Trademark Office*